United States Patent
Lewis

(10) Patent No.: US 7,043,729 B2
(45) Date of Patent: May 9, 2006

(54) REDUCING INTERRUPT LATENCY WHILE POLLING

(75) Inventor: Timothy A. Lewis, El Dorado Hills, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 40 days.

(21) Appl. No.: 10/214,909

(22) Filed: Aug. 8, 2002

(65) Prior Publication Data

US 2004/0031034 A1   Feb. 12, 2004

(51) Int. Cl.
*G06F 9/46* (2006.01)

(52) U.S. Cl. ............... 718/103; 718/107; 718/108; 712/244; 712/245; 710/260; 710/261; 710/262; 710/263; 710/264; 710/265; 710/266; 710/267; 710/268; 710/269

(58) Field of Classification Search .......... 709/100, 709/102, 103, 318; 710/260–269; 718/103, 718/107, 108; 712/244, 245
See application file for complete search history.

(56) References Cited

U.S. PATENT DOCUMENTS

| | | | | |
|---|---|---|---|---|
| 5,437,039 A | * | 7/1995 | Yuen | 709/108 |
| 5,465,335 A | * | 11/1995 | Anderson | 709/107 |
| 6,216,173 B1 | * | 4/2001 | Jones et al. | 345/705 |
| 6,427,161 B1 | * | 7/2002 | LiVecchi | 709/102 |

* cited by examiner

*Primary Examiner*—John Follansbee
*Assistant Examiner*—Ashok Patel

(57) ABSTRACT

Systems, methods, and software for reducing system management interrupt (SMI) latency while operating in system management mode. The present invention implements a technique for exiting system management mode while waiting for polled hardware events, handling any pending lower-priority interrupts and then resuming polling. The present invention does this by multi-threading SMI source handlers, using an idle thread, and using protocols for software-generated system management interrupts that insure that lower priority interrupts are serviced.

15 Claims, 8 Drawing Sheets

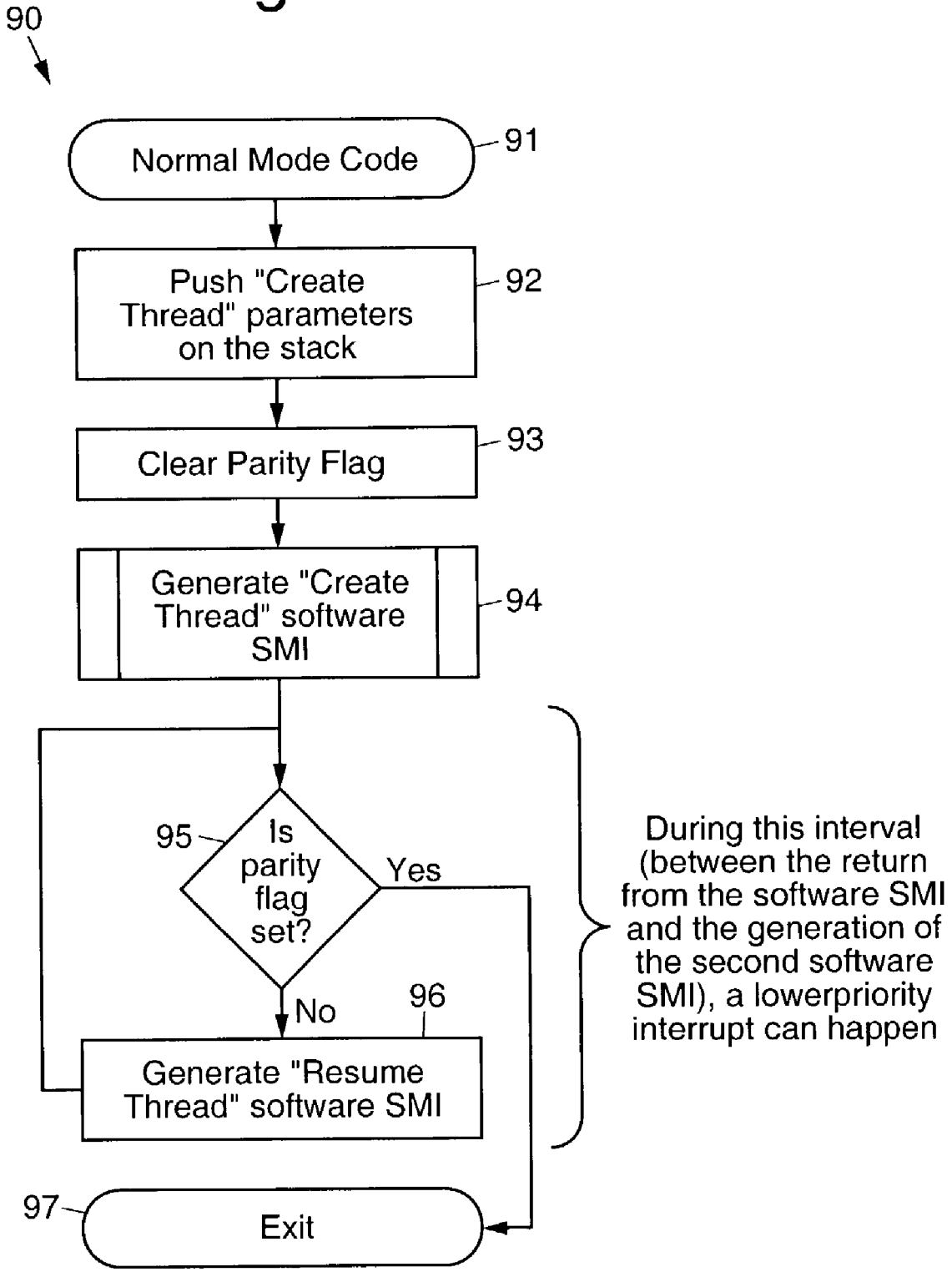

REDUCING INTERRUPT LATENCY WHILE POLLING

BACKGROUND

The present invention relates generally to computer systems, methods and software, and more particularly, to systems, methods, and software for reducing system management interrupt (SMI) latency while polling in system management mode.

System management interrupt (SMI) handlers typically must wait while polling for a hardware event, such as completion of data transfer for a hardware device. This wait period can cause execution of the SMI handler to be so long that other interrupts are not serviced in a timely fashion.

The system management mode (SMM) is entered when the CPU receives a system management interrupt. The SMI is the highest priority interrupt in the system and while the interrupt is being serviced, no other interrupts are serviced.

In general, the SMI handler is provided by system firmware. The other interrupt handlers are, in general, provided by the operating system. The SMI handler is hidden from the operating system. There are often dozens of possible SMI interrupt sources, hardware and software.

Many times the SMI handler is required to initiate actions, that require it to wait hundreds or thousands of milliseconds. Since the SMI is the highest priority interrupt and no other interrupts can be serviced while in System Management Mode, it is possible that the time spent servicing the SMI could cause other, lower-priority, interrupts to be missed. This can result in disrupted communications, delayed timers, broken-up audio, and the like.

Furthermore, since the SMI handler is hidden from the operating system, it is not possible to use such mechanisms as deferred procedure calls where the operating system or firmware would call again at a lower priority level so that these interrupts could be serviced.

There are several general themes in the prior art for handling difficulties relating to system management interrupt latency.

One is to simply ignore the problem. Since the actual occurrence of such errors is relatively small and since most communication systems have error recovery, no provision is made. This is the system used by most PC firmware solutions.

Another is a Deferred Procedure Call. The high priority interrupt saves the information needed to handle the interrupt and then schedules a deferred procedure call at a lower priority. This means that the time spent at the highest priority is relatively small and other interrupts can be serviced. This is the system used by Windows NT and other desktop operating systems.

Another is a Common Interrupt Handler. All interrupts, including SMI go to the same handler, which then schedules the appropriate event handler at a software-determined priority level and then exits. This is the system used by small real time operating systems (RTOS), such as Minos disclosed in "Operation Systems: Concepts and Design" published by McGraw-Hill© 1987, Milan Milenkovi, for example.

Another uses separate interrupt handlers in SMM. It is technically possible to service interrupts while in SMM. In this case, the interrupts are still serviced and so there is no latency issue.

Another is a specific hardware design. Through hardware design, some systems use SMIs to indicate the end of all long hardware transactions. This eliminates the need for polling. This is used in National Semiconductor integrated chipsets.

There are various disadvantages using the known prior art.

For example, errors do occur. Serial port transmission, USB 2.0 frame interrupts, lost timer ticks and audio break-up are all common symptoms. In many applications, these symptoms cause major operational difficulty.

The problem with the Deferred Procedure Call and the Common Interrupt Handler are that, while outside the SMI handler, the SMI handler is invisible to the operating system. So once scheduled to execute at a lower priority level, the SMI handler can no longer be called.

With regard to the use of separate interrupt handlers in system management mode, firstly, it is technically difficult to re-enable interrupts inside of SMM and there is no guarantee of broad support across CPU manufacturers. Secondly, it requires that, at the time of the SMI, the operating system is ready to service all interrupts. In many cases, SMIs are generated while all other interrupts are disabled temporarily.

Hardware design usually requires that the components of the system are tightly integrated, often by the same manufacturer.

In view of the above, it is an objective of the present invention to provide for systems, methods, and software for reducing system management interrupt latency while polling in system management mode.

SUMMARY OF THE INVENTION

To meet the above and other objectives, the present invention provides for systems, methods, and software that reduce system management interrupt (SMI) latency while operating in system management mode. The present invention implements a technique for exiting system management mode while waiting for hardware polling events, and the like, handling any pending lower-priority interrupts and then resuming polling. The present invention does this by multi-threading SMI source handlers and using special protocols for software-generated system management interrupts. More particularly, the present invention uses a cooperative multi-threading model for handling SMIs, an idle thread, and two protocols for insuring that lower priority interrupts are serviced.

Exemplary systems, methods, and software generate a system management interrupt, save the state of the CPU, and create an idle thread that represents the current code segment that is being executed. Then, system management mode is exited during a time period prior to a hardware polling event. Pending lower-priority interrupts are then serviced during the time period prior to the hardware polling event. System management mode is re-entered once the lower-priority interrupts are serviced. Polling is then resumed.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 7 is a flow diagram that illustrates operation of exemplary normal mode code.

DETAILED DESCRIPTION

Figure 1:
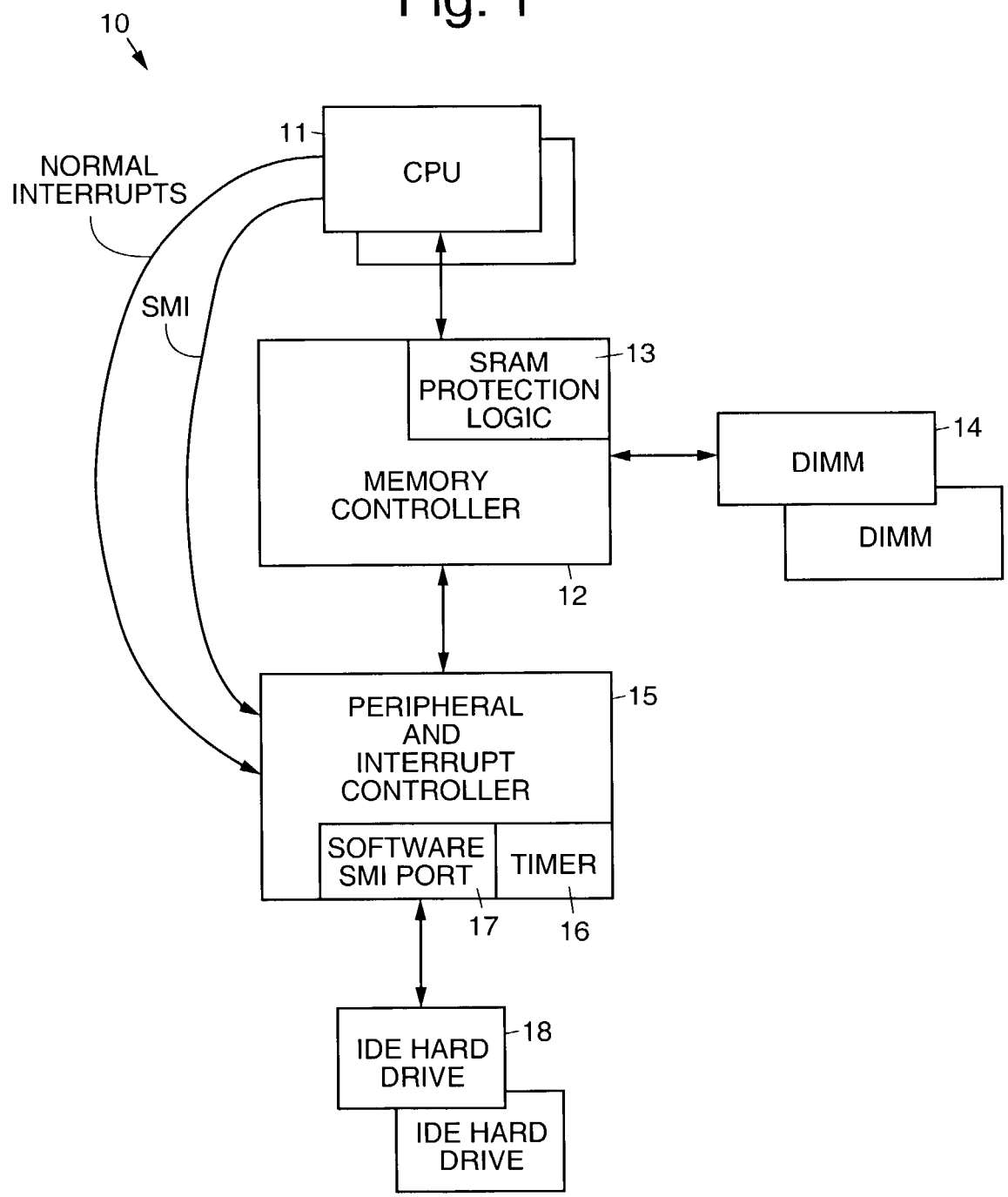
FIG. 1 illustrates an exemplary system in accordance with the principles of the present invention.

FIG. 1 illustrates an exemplary system 10 (computer system 10) in accordance with the principles of the present invention. The computer system 10 comprises the following components.

The computer system 10 comprises a central processing unit (CPU) 11 that is coupled to a memory controller 12 having SMRAM protection logic 13. The memory controller 12 is coupled to random access memory 14 (DIMMs). The memory controller 12 is also coupled to a peripheral and interrupt controller 15 having a timer 16 and a software system management interrupt (SMI) port 17. The peripheral and interrupt controller 15 is coupled to one or more hard drives 18, such as intelligent (or integrated) drive electronics (IDE) hard drives 18, for example. The central processing unit 11 generates normal interrupts and system management interrupts (SMIs) that are sent to the peripheral and interrupt controller 15. The computer system 10 also comprises an operating system.

Figure 2:
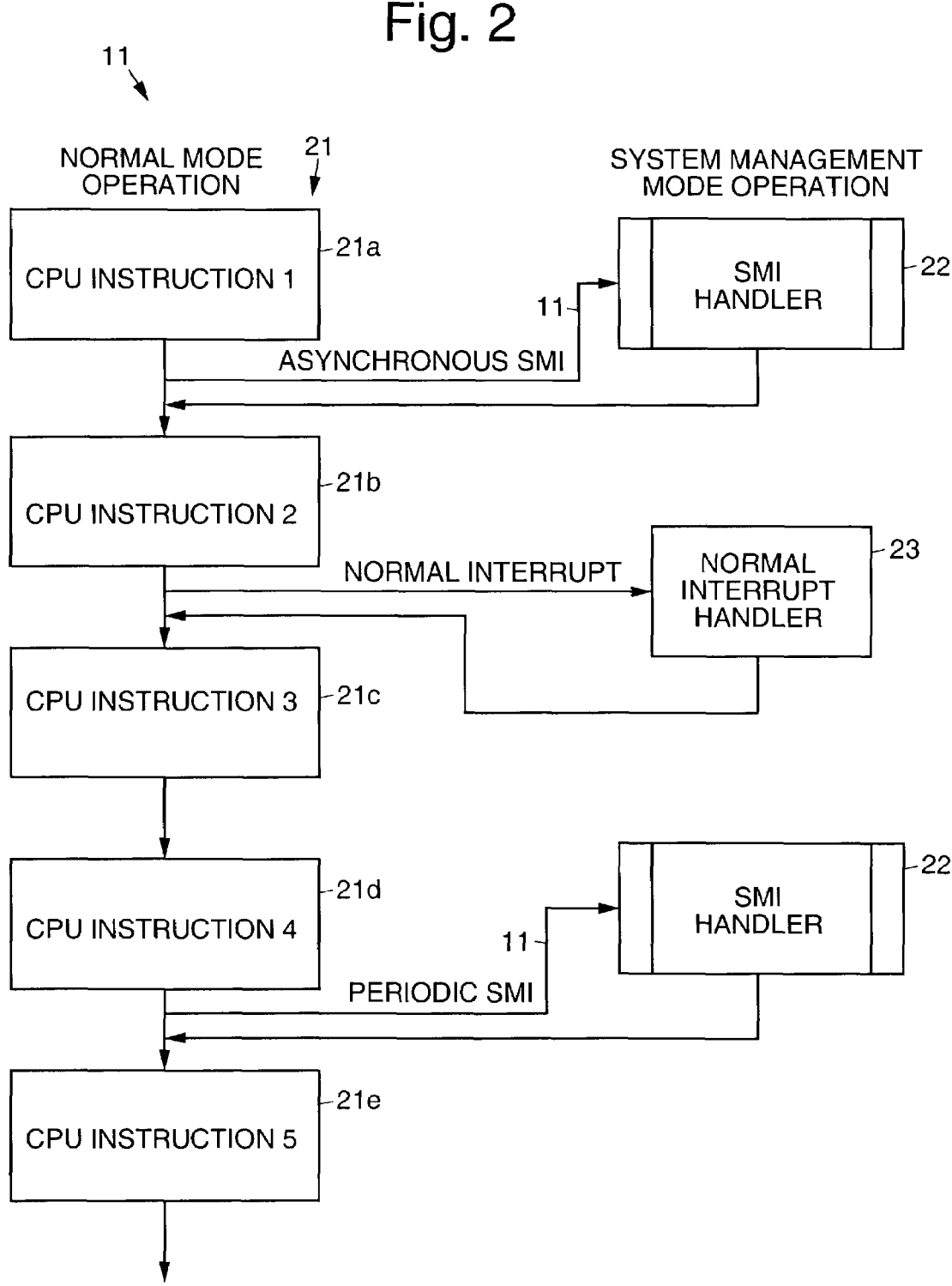
FIG. 2 illustrates normal mode and system management mode operation in the system shown in FIG. 1.

FIG. 2 illustrates normal mode and system management mode operation in the computer system 10 shown in FIG. 1. In normal mode operation, the central processing unit 11 sequentially processes instructions 21. Five CPU instructions 21a–21e are illustrated in FIG. 2. During processing of the instructions 21, normal interrupts and system management interrupts are generated by the operating system of the computer system 10.

As is illustrated in FIG. 2, a system management interrupt, such as an asynchronous SMI, may be generated that causes the system 10 to enter system management mode operation. The asynchronous SMI is processed by an SMI handler 22. After processing of the asynchronous SMI by the SMI handler 22, processing returns to normal mode operation. A normal interrupt may then be generated that is processed by a normal interrupt handler 23. After processing of the normal interrupt by the normal interrupt handler 23, processing returns to normal mode operation. A periodic SMI may then be generated that is processed by the SMI handler 22. After processing of the periodic SMI by the SMI handler 22, processing returns to normal mode operation. Processing of the system management interrupts has traditionally caused a slowdown in processing speed of the system 10 because the SMI is fully processed before returning to normal mode operation.

Figure 3:
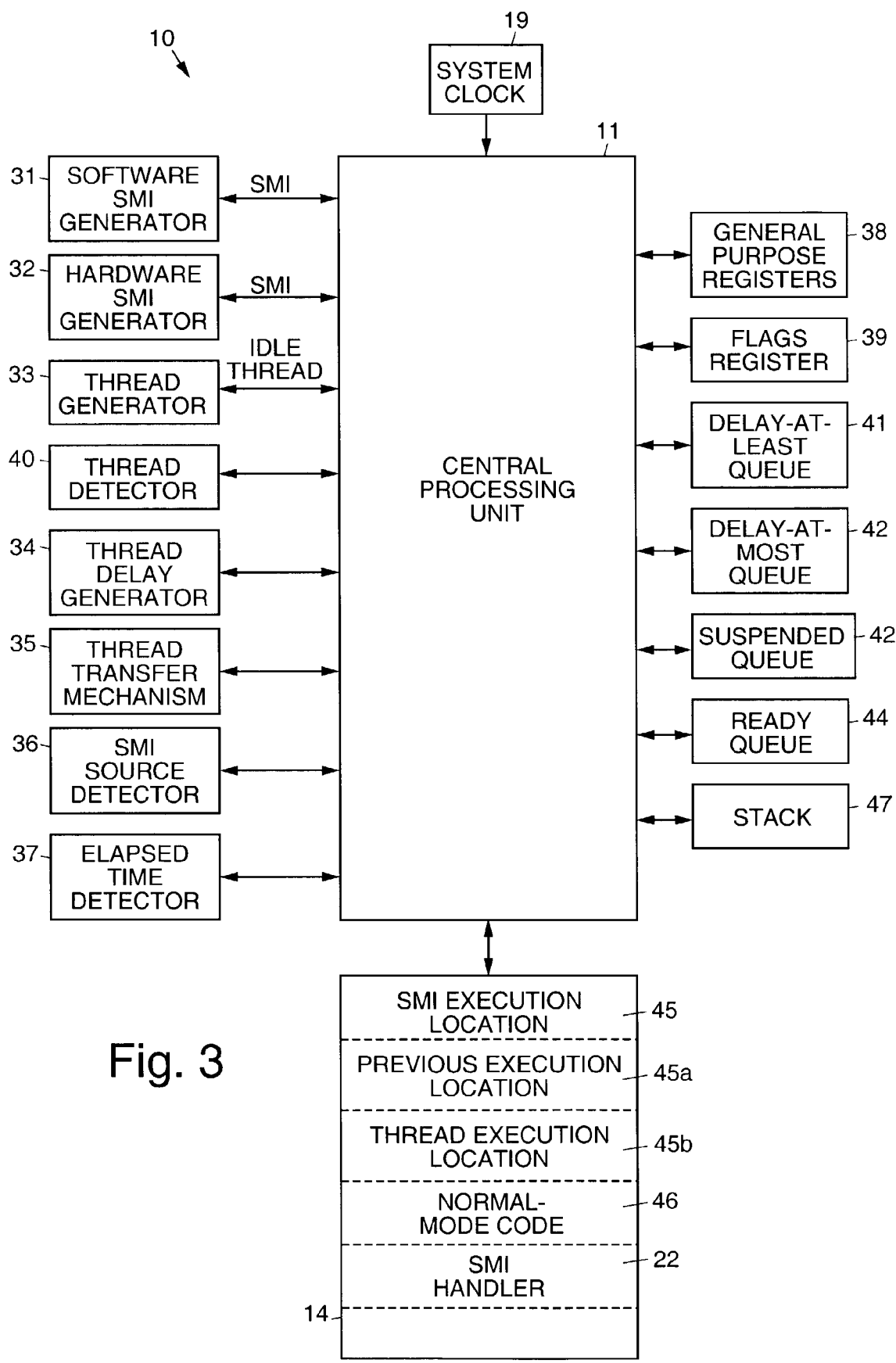
FIG. 3 logically illustrates components of the system shown in FIG. 1.

Referring now to FIG. 3, it logically illustrates components of the computer system 10 shown in FIG. 1. Logically, the computer system 10 comprises the central processing unit (CPU) 11, the memory 14, and a system clock 19. The CPU 11 is configured to respond to a system management interrupt and, at this time, change its execution location 45 to a previously defined location 45a. The system 10 is configured to save the state of the CPU 11 upon entry into the system management interrupt handler 22 (or SMI event handler 22) and restore the state of the CPU 11 upon exit from the SMI handler 22. The state includes, at a minimum, the previously defined execution location 45a, the state of a flags register 39 and the physical address (or means to determine the physical address) of a stack 47. The process of saving the state of the CPU 11 upon entry to the SMI handler 22 may be a hardware or software controlled activity, depending on the type of CPU 11.

A software SMI generator 31 is provided for generating software SMIs. Generally, this is an I/O or memory location which, when written to, causes an SMI to be generated. Once inside of the SMI handler, it is possible to detect that the interrupt was generated by this method and, often, the value which was written to the location. A hardware SMI generator 32 is provided for generating hardware SMIs at predetermined intervals. A thread detector 40 is provided for detecting that the source of an SMI is the hardware SMI generator 32. The thread detector 40 is capable of detecting that the source of an SMI is the software SMI generator 31.

A thread generator 33 is provided for creating different execution threads. These execution threads include at least the current execution location 45b, their own general purpose registers 38 and their own stack 47. The thread generator 33 is configured to create, suspend, resume and destroy execution threads. A list of threads ready for execution is held in a ready queue 44. The list of suspended threads is held in a suspended queue 42.

An idle thread is provided, generated by the thread generator 33, that runs at the lowest thread priority, and which exits the SMI handler 22 to either schedule a recurring SMI or modify the saved flags register 39 of the CPU 11. In many cases, this can be the thread of execution at the point when the SMI handler 22 is entered.

A thread delay generator 34 is provided that is configured to delay a thread for at least a predetermined period of time. A list of such delay threads is held in a delay-at-least queue 41. The thread delay generator 34 is also configured to delay a thread for at most the predetermined period of time. A list of such threads is held in a delay-at-most queue 42, which may be implemented as a version of the delay-at-least queue 41.

A thread transfer mechanism 35 is provided by which normal-mode code 46 (i.e., non-SMI handler code 46) can move all threads in the delay-at-most queue 42 into the ready queue 44 so that they are ready for execution.

An SMI source detector 36 is provided for detecting a source of an SMI and for creating an appropriate thread to handle the SMI. The SMI source detector 36 is also configured to detect whether the CPU 11 entered the SMI handler 22 using a software SMI. This is usually an SMI generated by writing to a particular input/output (I/O) port of the CPU 11. The value that is written usually determines the type of service that is desired. An elapsed time detector 37 is provided for reading the system clock 19 to determine the amount of elapsed time since the last time the system clock was read.

Elapsed time may be calculated in many ways. In general, there are system-wide clocks (which start at some point and continue to run as long as the system is on), there are elapsed-time clocks (which indicate how much time has gone by since they were started), and there are periodic clocks (which start when they are enabled and then fire off an interrupt or SMI every so often. In each of these cases, it is possible to calculate the elapsed time, either by saving the current time, then reading and calculating the difference (system clock), reading the clock (elapsed time clock), or adding a fixed amount of time to a saved value (periodic clock). There may be other means as well. The elapsed time clock is required to determine how much time has gone by since the last time it tried to determine the time.

Normal-mode code 46 (i.e., non-SMI handler code 46) can use the software SMI generator 31 to create an SMI thread, executing at a specified address, with the specified contents in the general-purpose registers 38.

Figure 4:
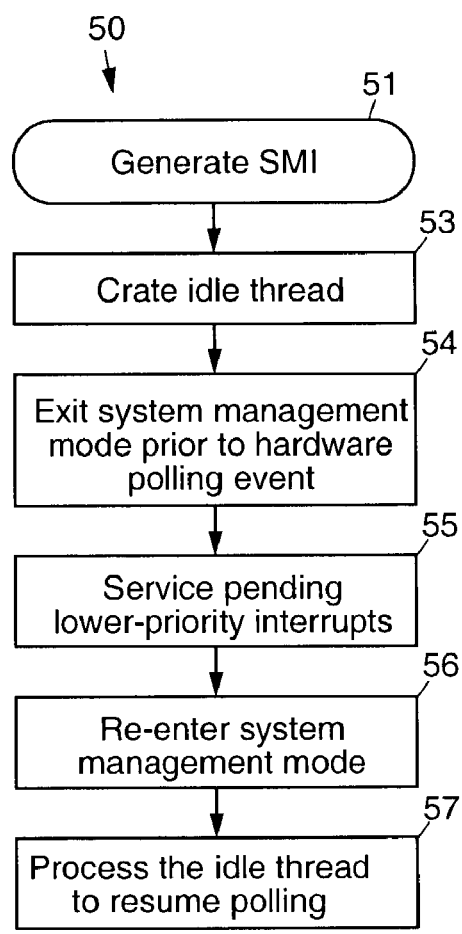
FIG. 4 is a flow diagram that illustrates an exemplary generalized method in accordance with the principles of the present invention that reduces system management interrupt latency while polling in system management mode.

FIG. 4 is a flow diagram that illustrates an exemplary generalized method 50 in accordance with the principles of the present invention that reduces system management interrupt latency while polling in system management mode. The exemplary method 50 comprises the following steps.

A system management interrupt is generated, 51 which causes the system to operate in system management mode. The state of the system 10 is saved 52. An idle thread is created 53 that represents the current code segment that is being executed. System management mode is exited 54 during a time period prior to the hardware event for which the system is polling. Pending lower-priority interrupts are serviced 55 during the time period prior to the hardware event. Once the lower-priority interrupts are serviced 55, system management mode is re-entered 56, and polling threads are resumed long enough to check if the hardware event has occurred. If not, the thread suspends itself again.

In general, polling is resumed using one of two methods. Either a resume software SMI is generated or a periodic SMI occurs. In either case, the idle thread dispatches to the handlers of these two "special" SMI events, which, in turn, determine whether any threads are ready to be scheduled based on the amount of elapsed time.

Figure 4A:
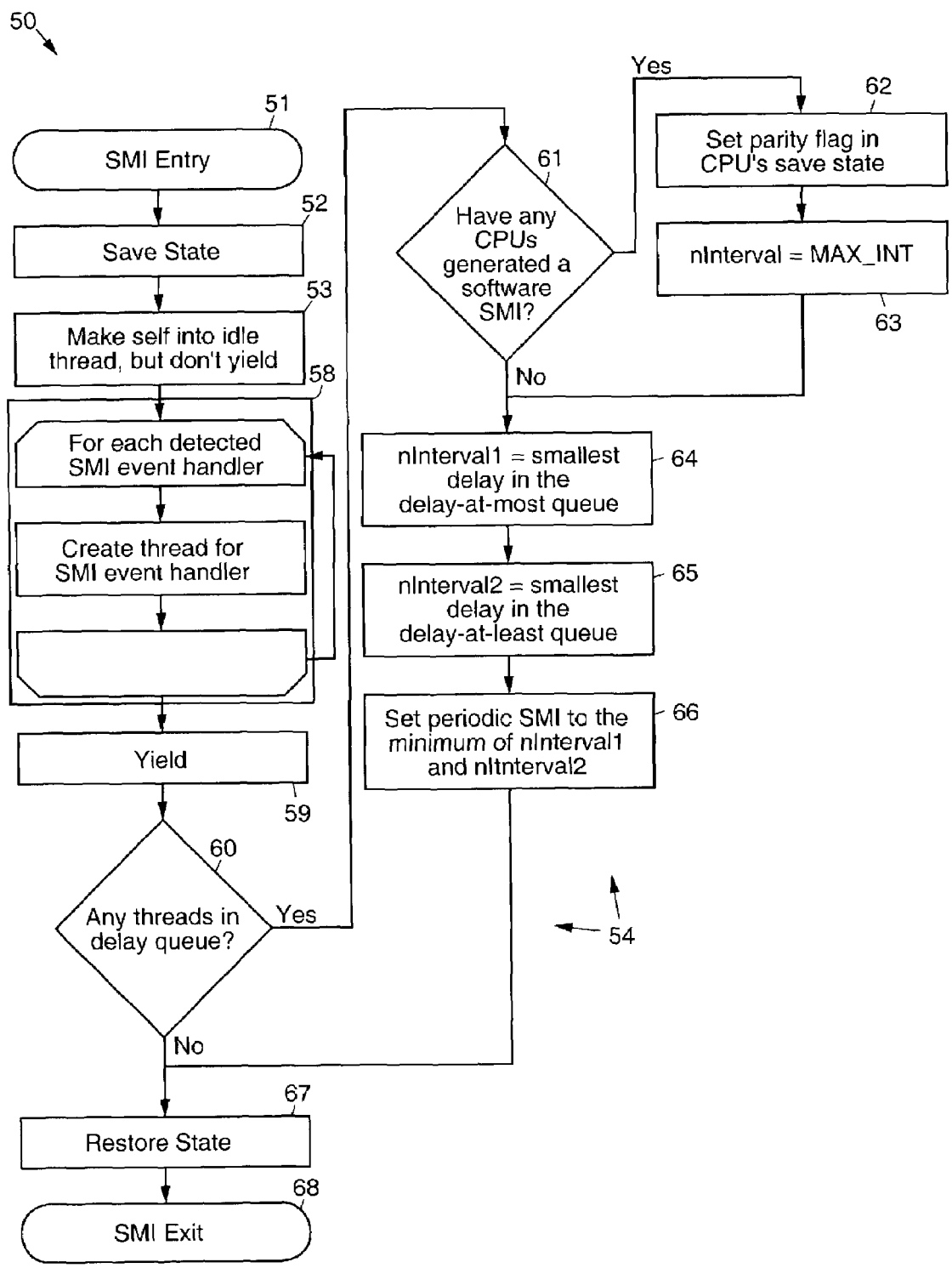
FIG. 4a is a flow diagram that illustrates details of the exemplary method shown in FIG. 2.

FIG. 4a is a flow diagram that illustrates details of the exemplary method 50 shown in FIG. 4. In accordance with the method 50, a system management interrupt is generated 51 to enter into system management mode. An idle thread is created 53 that represents the current code segment that is being executed, but does not yield to any threads ready for scheduling. A thread is then created 58 for each detected SMI event handler 22. The idle thread then yields 59.

System management mode is then exited 54 during the time period prior to the hardware event for which a thread is polling. To achieve this, it is determined 60 if there are any threads in the delay queue 41, 42 (delay-at-least queue 41, delay-at-most queue 42). If there are no threads in the delay queue (No), the state of the CPU 11 is restored 67 and the SMI is exited 68.

If there are threads in the delay queue (Yes), it is determined 61 if any CPUs 11 have generated a software SMI. If a software SMI has been generated (Yes), a parity flag (or some other indicator in a saved CPU register) is set 62 in the save state of the CPU 11, and a first interval value (nInterval 1) is set 63 to a maximum interval (MAX_INT). The parity flag is just one way of indicating whether a Resume thread software SMI should be generated. There are others, generally in any CPU register or hardware register which are commonly accessible by the SMI handler 22 and normal mode code.

If there are no threads in the delay queue (No), nInterval1 is set 64 to the smallest delay in the delay-at-most queue 42. Then, a second interval value (nInterval 2) is set 65 to the smallest delay in the delay-at-least queue 41. Then, the periodic SMI is set 66 to the minimum of nInterval 1 and nInterval 2. Then, the state of the CPU 11 is restored 67 and the SMI is exited 68.

Figure 5:
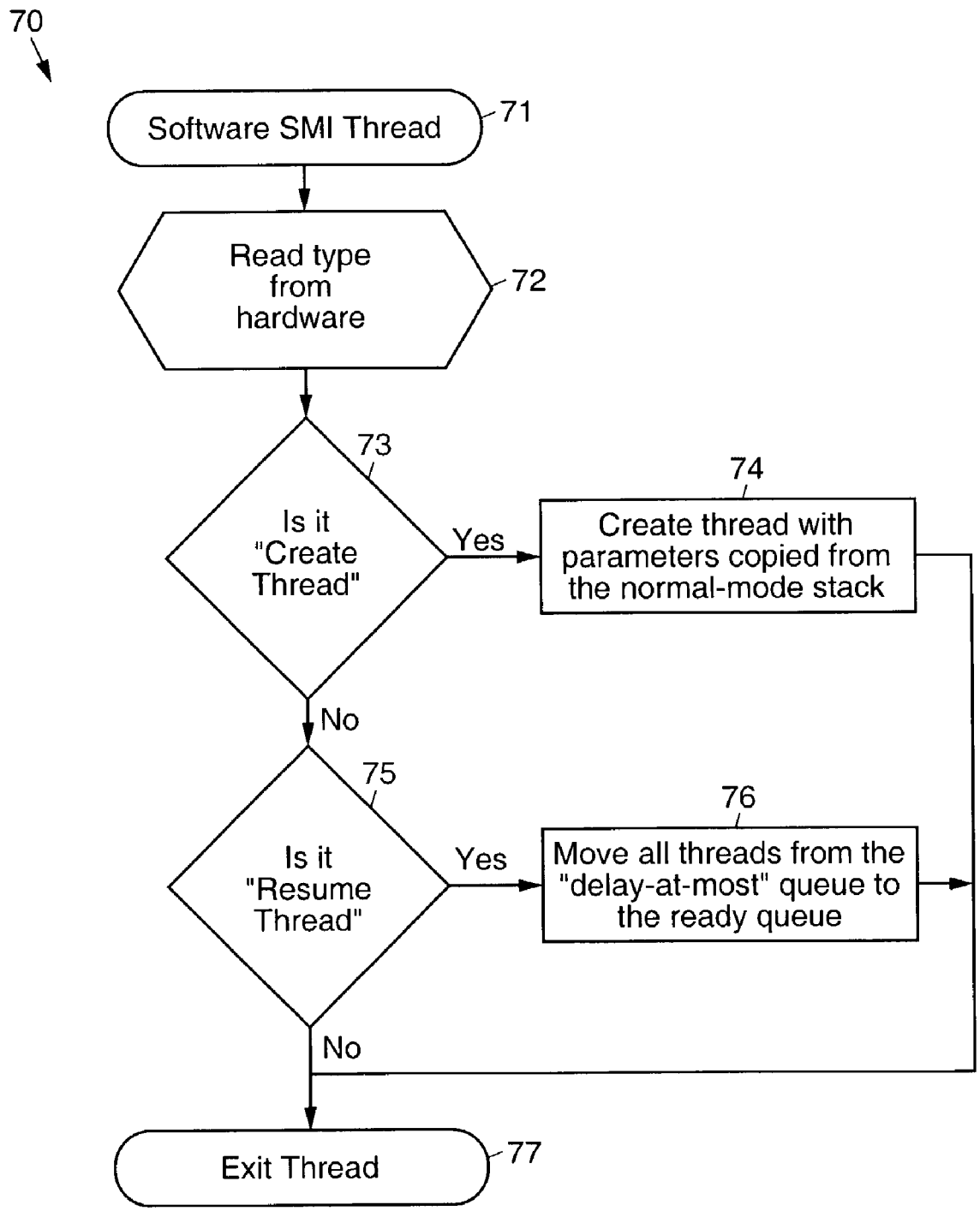
FIG. 5 is a flow diagram that illustrates operation of an exemplary software SMI thread.

FIG. 5 is a flow diagram that illustrates a method 70 of operation of an exemplary software SMI thread. A software SMI thread is generated 71. The software SMI thread type is read 72 from hardware that generated it. It is then determined 73 if the software SMI thread is a Create thread. If the software SMI thread is a Create thread (Yes), then a thread is created 74 having parameters copied from a normal mode stack 47. The thread then exits 77.

If the software SMI thread is not a Create thread (No), it is determined 75 if it is a Resume thread. If the software SMI thread is a Resume thread (Yes), then all thread are moved 76 from the delay-at-most queue 42 to the ready queue 44. If the software SMI thread is not a Resume thread (No), then the thread exits 77.

Figure 6:
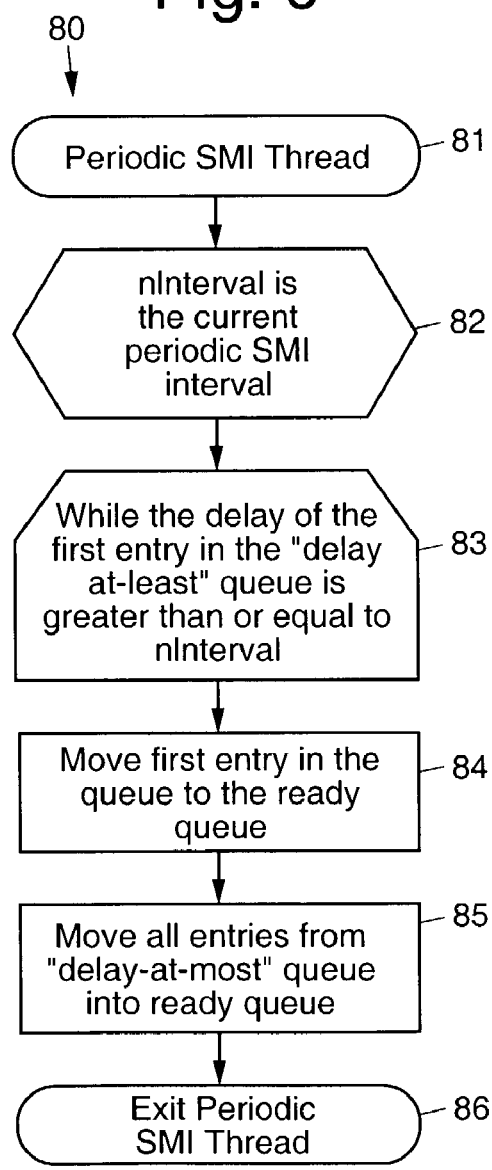
FIG. 6 is a flow diagram that illustrates operation of an exemplary periodic SMI thread.

FIG. 6 is a flow diagram that illustrates a method 80 of operation of an exemplary periodic SMI thread. A periodic SMI thread is generated 81. The interval value (nInterval) is the current periodic SMI interval 82. In step 83, while the delay of the first entry in the delay-at-least queue 41 is greater than or equal to nInterval, the first entry in the delay-at-least queue 41 is moved 84 to the ready queue 44. Then, all entries are moved 85 from the delay-at-most queue 42 into the ready queue 17d. The periodic SMI thread is exited 86.

FIG. 7 is a flow diagram that illustrates a method 90 of operation of exemplary normal mode code. The normal mode code is executed 91. Create thread parameters are pushed 92 onto the stack 19. The parity flag (or other indicator) is then cleared 93. A Create thread software SMI is then generated 94. Then, it is determined 95 is the parity flag is set. If it is not set, a Resume thread software SMI is generated 96 and the test for the set parity flag (or other indicator) is repeated until the parity flag(or other indicator) is set. If the parity flag (or other indicator) is set (Yes), the normal mode code exits 97. During the interval between the return from the software SMI and the generation of the second software SMI, a lower priority interrupt can occur.

Figure 8:
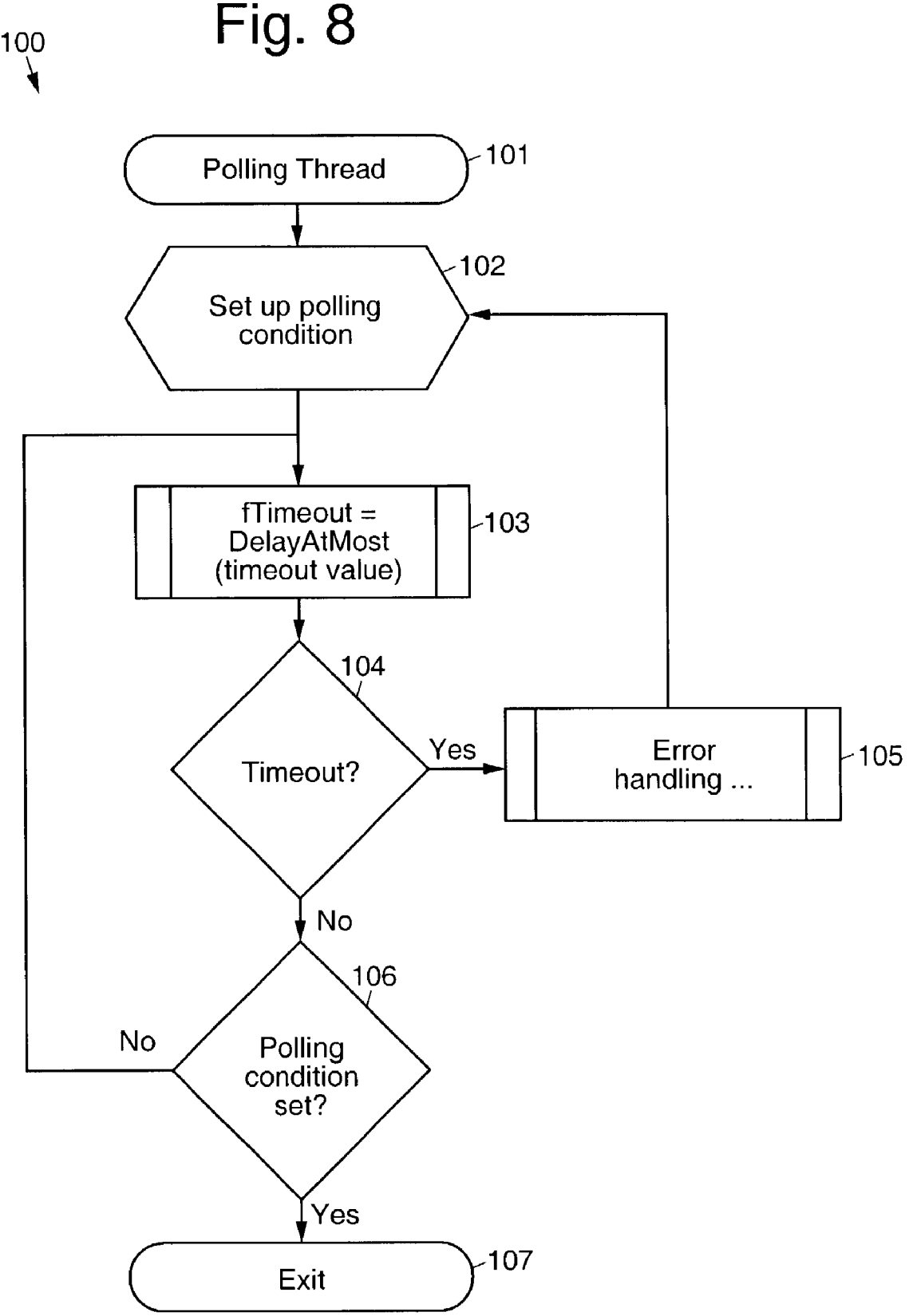
FIG. 8 is a flow diagram that illustrates a polling thread example using the present invention.

FIG. 8 is a flow diagram that illusfrates a polling thread example 100 of the present invention. A polling thread is generated 101. A polling condition is set up 102. A value if timeout is set 103 to a DelayAtMost timeout value. It is then detennined 104 if a timeout has occurred. If the timeout has occurred (Yes), error handling 105 is done and the method returns to the setup polling condition step 102. If a timeout has not occurred (No), it is determined 106 if the polling condition is set. If it has not they the method returns to set 103 value of fTimeout to the DelayAtMost timeout value and the process repeats. Once the polling condition is set (Yes), the polling thread is exited 107.

Alternative embodiments of the present invention may include additional multi-threading capabilities, including thread-prioritization, mutexes, semaphores, and priority inversion, and the like. A mutex is a program object that allows multiple program threads to share the same resource, such as file access, but not simultaneously. When a program is started, a mutex is created with a unique name. Thereafter, any thread that needs the resource locks the mutex from other threads while it is using the resource. The mutex unlocks when the data is no longer needed or the routine is finished.

A semaphore is a hardware or software flag. In multitasking systems, a semaphore is a variable with a value that indicates the status of a common resource. It is used to lock the resource that is being used. A process needing the resource checks the semaphore to determine the resource's status and then decides how to proceed.

Also, the means by which normal-mode code 46 creates an SMI thread may be accomplished in several ways, including using a shared queue that contains thread-creation parameters. The normal-mode code 46 places entries into the shared queue and, during a periodic SMI, the parameters are authenticated and a thread is created. Alternatively, the parameters may be pushed onto the stack 47 and a software-SMI (usually a value written to an I/O port) generated. The handler for the software-SMI retrieves the parameters from the normal-mode stack 47 and creates the thread. Although the latter requires more work to get the information from the normal-mode stack 47, it is general more convenient and allows for better scheduling latency (i.e., the time between when the thread information is present and the time the thread is actually scheduled).

Furthermore, the means (thread transfer mechanism 35) by which normal-mode code 35 moves all threads in the delay-at-most stack 42 into the ready queue 44 so that they are ready for execution may be accomplished from a queue or status bit that is polled during the execution of a periodic SMI or through a software-SMI.

Advantages of the present invention over prior art are that the average latency for lower-priority interrupts is improved, it works in all systems using SMIs, and it handles both synchronous services (software SMIs) and asynchronous services (hardware generated SMIs). Novel aspects of the present invention include exiting the SMI handler and then re-entering it later, thus giving lower-priority interrupts a chance to be handled.

Thus, systems, methods, and software for reducing system management interrupt (SMI) latency while polling in system management mode have been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A system having reduced system management interrupt (SMI) latency while pullng in system management mode, comprising: a central processing unit (CPU) coupled to a memory and comprising a system clock, a SMI handler, a flags register, a delay queue for storing a list of delay threads and a list of delayed threads, a suspended queue for storing a list of suspended threads, a ready queue for storing a list of threads ready for execution, and a stack, which CPU is capable of responding to a system management interrupt and, at this time, changing its execution location to a previously defined location;
   a software SMI generator for generating software SMI's;
   hardware SMI generator for generating SMI at predetermined intervals;
   thread detector for detecting the source of the SMI;
   an elapsed time detector for reading the system clock to determine the amount of elapsed time since the last time the system clock was read;
   a thread generator for creating different execution threads that include at least the current execution location, their own general purpose registers and their own stack and for creating, suspending, resuming and destroying execution threads;
   a thread delay generator for delaying a thread for at least a predetermined period of time, and for delaying a thread for at most the predetermined period of time;
   an SMI source detector for detecting a source of the SMI an for creating an appropriate thread to handle the SMI, and for detecting whether the CPU entered the SMI handler using a software SMI;
   an idle thread that runs at a lowest thread priority, and which exits the SMI handler to either schedule a recurring SMI or modify the saved flags register of the CPU;
   normal-node code for using the software SMI generator to create an SMI thread that executes at a specified address, with the specified contents in the general-purpose registers;
   a thread transfer mechanism by which threads in the delay queue are moved into the ready queue so that they are ready for execution; and software code comprising:
   a code segment that generates a system management interrupt;
   a code segment that saves the state of the CPU;
   a code segment that creates an idle thread derived from the saved state;
   a code segment that exits system management mode during a time period prior to a hardware polling event;
   a code segment that services pending lower-priority interrupts during the time period prior to the hardware polling event;
   a code segment that re-enters system management mode once the lower priority interrupts are serviced; and
   a code segment that resumes polling.

2. The system recited in claim 1 wherein the code segments that exits system management mode and services pending lower-priority interrupts comprise:
   a code segment that creates a thread for each detected SMI event handler;
   a code segment that determines if there are any threads in a delay queue;
   a code segment that, if there are no threads in the delay queue, restores the state of the CPU and exits the SMI;
   a code segment that, if there are threads in the delay queue, determines if a CPU has generated a software SMI;
   a code segment that, if a software SMI has been generated, sets an indicator in the save state of the CPU, and sets a first interval value to a maximum interval;
   a code segment that, if there are no threads in the delay queue, sets the first interval value of the smallest delay in the delay queue;
   a code segment that sets a second interval value to the smallest delay in the delay queue; and
   a code segment that sets a periodic SMI to the minimum of the first and second interval values.

3. The system recited in claim 1 wherein the software code comprises code segments that:
   generate a software SMI thread;
   read the software SMI thread type from hardware that generated it;
   determine if the software SMI thread is a create thread;
   if the software SMI thread is a create thread, create a thread having parameters copied from a normal mode stack and exit the thread;
   if the software SMI thread is not a create thread, determine if it is a resume thread;
   if the software SMI thread is a resume thread, move threads form the delay queue to the ready queue; and
   if the software SMI thread is not a resume thread, exit the software SMI thread.

4. The system recited in claim 1 wherein the software code comprises code segments that:

generate a periodic SMI thread;
set an interval value to a current periodic SMI interval;
while the delay of the first entry in the delay queue is greater than or equal to the interval value, move the first entry in the delay queue to the ready queue;
move all entries from the delay queue into the ready queue; and
exit the periodic SMI thread.

5. The system recited in claim 1 wherein the software code comprises code segments that:
execute the normal mode code;
push create thread parameters onto the stack;
clear an indicator whether a resume thread software SMI should be generated;
general a create thread software SMI;
determine if the indicator is set;
if the indicator is not set, generate a resume thread software SMI and request the test for the set indicator until it is set; and
if the in indicator is set, exit the normal mode code.

6. A method, for use in a system comprising a central processing unit (CPU), for reducing system management interrupt (SMI) latency while polling in system management mode, comprising the steps of:
generating a system management interrupt;
saving the state of the CPU;
creating an idle thread derived from the saved state;
exiting system management mode during a time period prior to a hardware polling event;
servicing pending lower-priority interrupts during the time period prior to the hardware polling event;
re-entering system management mode once the lower-priority interrupts are serviced; and
resuming polling.

7. The method recited in claim 6 wherein the steps of exiting system management mode and servicing pending lower-priority interrupts comprises the steps of:
creating a thread for each detected SMI event handler;
deterinting if there are any threads in a delay queue;
if there it no threads in the delay queue, restoring the state of the CPU and exit the SMI;
if there are threads in the delay queue, determining if a CPU has generated a software SMI;
if a software SMI has been generated, setting an indicator in the save state of the CPU, and setting a first interval value to a maximum interval;
if there are no threads in the delay queue, setting the first interval value to the smallest delay in a delay queue;
setting a second interval value to the smallest delay in a delay queue; and
setting a periodic SMI to the minimun of the first and second interval values.

8. The method recited in claim 6 which comprises:
generating a software SMI thread;
reading the software SMI thread type from hardware that generated it;
determining if the software SMI thread is a create thread;
if the software SMI thread is a create thread, creating a thread having parameters copied from a normal mode stack and exiting the thread;
if the software SMI thread is not a create thread, determining if it is a resume thread;
if the software SMI thread is a resume thread, moving threads from the delay queue to the ready queue; and
if the software SMI thread is not a resume thread, exiting the software SMI thread.

9. The method recited in claim 6 which comprises:
generating a periodic SMI thread;
setting an interval value to a current periodic SMI interval;
while the delay of the first entry in the delay queue is greater than or equal to the interval value, moving the first entry in the delay queue to the ready queue;
moving all entries from the delay queue into the ready queue; and
exiting the periodic SMI thread.

10. The method recited in claim 6 which comprises:
executing the normal mode code;
pushing create thread parameters onto the stack;
clearing an indicator that indicates whether a resume thread software SMI should be generated;
generating a create thread software SMI;
determinating if the indicator is set;
if the indicator is not set, generating a resume thread software SMI and repeating the text for the set indicator until it is set; and
if the indicator is set, exiting the normal mode code.

11. A computer program stored in a computer readable medium for reducing system management interrupt (SMI) latency while polling in system management in mode, comprising:
a code segment that generates a system management interrupt;
a code segment that saves the CPU state;
a code segment that creates an idle thread derived from the saved state;
a code segment that exits system management mode during a timer period prior to a hardware event for which the code is waiting;
a code segment that services pending lower-priority interrupts during the time period prior to the hardware polling event;
a code segment that re-enters system management mode once the lower-priority interrupts are serviced; and
a code segment that resumes polling.

12. The code segments of claim 11 that exits system management made and services pending lower-priority interrupts comprise:
a code segment that creates a thread for each detected SMI event handler;
a code segment that determines if there are any threads in a delay queue;
a code sergment that, if there are no threads in the delay queue, restores the state of the CPU and exit the SMI;
a code segment that, if there are threads in the delay queue, determines if a CPU has generated a software SMI;
a code segment that, if a software SMI has been generated, sets an indicator in the save state of the CPU, and sets a first interval value to a maximum interval;
a code segment that, if there are no threads in the delay queue, sets a first interval value to the smallest delay in a delay queue;
a code segment that sets a second interval value to the smallest delay in the delay queue; and
a code segment that sets a periodic SMI to the minimum of the first and second interval values.

13. The computer program stored in a computer readable medium recited in claim 11, further including code segments that:
generae a software thread;
read the software SMI Thread type from hardware that generated it;

derermine if the software SMI thread is a create thread;

if the software SMI tread is a create thread, create a tread having parameters copied from a normal mode stack and exit the thread;

if the software SMI thread is not a create thread, determine if it is a resume thread;

if the software SMI thread is a resume thread, move threads from the delay queue to the ready queue; and if the software SMI thread is not a resume thread, exit the software SMI thread.

14. The computer program stored in a computer readable medium recited in claim 11, further including code segments that:

generatt a periodic SMI thread;

set an interval value to a current periodic SMI interval;

while the delay of the first entry in the delay queue is greater than or equal to the interval value, move the first entry in the delay queue to the ready queue;

move all entries from the delay queue into the ready queue; and exit the periodic SMI thread.

15. The computer program stored in a computer readable medium recited in claim 11, further including code segments that:

execute normal mode code;

push create thread parameters onto the stack;

clear an indication that indicates whether a resume thread software SMI should be generated;

generated a create thread software SMI;

determine if the indicator is set;

if the indicator is not set, generate a resume thread software SMI and repeat the test for the set indicator until it is set; and if the indicator is set, exit the normal mode code.

* * * * *